(12) United States Patent
Kim et al.

(10) Patent No.: US 10,323,740 B2
(45) Date of Patent: Jun. 18, 2019

(54) DIFFERENTIAL FOR AUTOMOBILE

(71) Applicant: NEOOTO CO., LTD., Seoul (KR)

(72) Inventors: Sun Hyun Kim, Seoul (KR); Jong Chan Kim, Chungcheongnam-do (KR)

(73) Assignee: NEOOTO CO., LTD., Seoul (KR)

( * ) Notice: Subject to any disclaimer, the term of this patent is extended or adjusted under 35 U.S.C. 154(b) by 68 days.

(21) Appl. No.: 15/834,455

(22) Filed: Dec. 7, 2017

(65) Prior Publication Data

US 2018/0195597 A1   Jul. 12, 2018

(30) Foreign Application Priority Data

Jan. 12, 2017  (KR) .................. 10-2017-0005592

(51) Int. Cl.
*F16H 48/40* (2012.01)
*F16H 48/08* (2006.01)

(52) U.S. Cl.
CPC ............. *F16H 48/40* (2013.01); *F16H 48/08* (2013.01)

(58) Field of Classification Search
None
See application file for complete search history.

(56) References Cited

FOREIGN PATENT DOCUMENTS

| JP | 05-209656 A | 8/1993 |
|---|---|---|
| JP | 2000-304122 A | 11/2000 |
| JP | 2016-137840 A | 8/2016 |
| KR | 10-0589075 B1 | 6/2006 |
| KR | 10-2011-0016752 A | 2/2011 |
| KR | 10-1161674 B1 | 8/2012 |

*Primary Examiner* — Dirk Wright
(74) *Attorney, Agent, or Firm* — Paratus Law Group, PLLC

(57) ABSTRACT

A differential for an automobile according to an exemplary embodiment of the present invention includes: a housing in which a pinion gear and a plurality of side gears are disposed and is provided with a flange portion in which a coupling hole is formed at an outer side thereof; and a bush which has an insertion portion which is inserted into the coupling hole and is provided with a thread at an inner surface thereof so as to be coupled with a coupling member. Since the coupling member is not directly coupled to the housing but is coupled to the bush which is connected to the housing, the direct contact friction between the housing and the coupling member which are made of different materials can be avoided and thus the damage of the coupling section can be prevented.

7 Claims, 5 Drawing Sheets

DIFFERENTIAL FOR AUTOMOBILE

CROSS-REFERENCE TO RELATED APPLICATION

This application claims priority to and the benefit of Korean Patent Application No. 10-2017-0005592 filed in the Korean Intellectual Property Office on Jan. 12, 2017, the entire contents of which are incorporated herein by reference.

TECHNICAL FIELD

The present invention relates to a differential for automobiles, and more particularly to a differential having an improved connecting structure between a housing and a connecting member for fixing a ring gear to the housing.

BACKGROUND ART

A differential for an automobile is a power transmitting device in which a pinion gear and side gears, which are disposed within a case, are engaged with one another so as to transmit the driving force transmitted from a ring gear to a drive shaft while allowing a rotational speed difference between left and right wheels.

A case of a differential is generally formed by a casting or a forging using aluminum alloy or magnesium alloy, and a ring gear is coupled to a flange of the case via bolts.

However, since the strength of the aluminum alloy or the magnesium alloy is lower than the steel, the coupling portion between the bolts and the case may be damaged or deformed by the shock applied to the case, and this may weaken the coupling force therebetween.

Meanwhile, as a technology for reinforcing the strength of the flange of the case to which the ring is coupled, a method of forming a rib in the coupling portion or a method of directly connecting a pinion shaft to the ring gear has been introduced.

However, the rib formed in the coupling portion may cause an interference with other components, and it may also have restrictions in the forming due to its complicated shape. Also, a method of directly connecting a pinion shaft to the ring gear needs not only the change of the shape of the ring gear but also an additional forming process, so it is difficult to be applied.

Prior art document: Korea Patent No. 10-1161674

DETAILED DESCRIPTION OF THE INVENTION

Technical Problem

The present invention has been made in an effort to provide a differential for an automobile in which the coupling member is not directly coupled to the housing but is coupled to the bush which is connected to the housing so that the direct contact friction between the housing and the coupling member which are made of different materials can be avoided and thus the damage of the coupling section can be prevented.

Technical Solution

A differential for an automobile according to an exemplary embodiment of the present invention includes: a housing in which a pinion gear and a plurality of side gears are disposed and is provided with a flange portion in which a coupling hole is formed at an outer side thereof; and a bush which has an insertion portion which is inserted into the coupling hole and is provided with a thread at an inner surface thereof so as to be coupled with a coupling member.

The bush may include: a seating portion in a ring shape which is seated on one surface of the flange portion; and the insertion portion which is protruded by a predetermined length along a center axis direction from the seating portion to be inserted into the coupling hole.

The insertion portion may be formed in a cylindrical shape and is formed in a shape corresponding to the coupling hole to linearly move along a center axis direction of the housing to be inserted into the coupling hole while being coupled to the flange portion.

A through hole penetrating the seating portion and the insertion portion may be formed in the bush, and the thread may be formed on an inner surface of the bush defining the through hole. An outer diameter of the insertion portion may correspond to a diameter of the through hole of the flange portion or may be greater than the diameter of the through hole of the flange portion.

The housing may include: a first housing in which the pinion gear and one of the plurality of the side gears which are engaged with the pinion gear are disposed and which is provided with a portion of the flange portion at an outer side thereof; and a second housing which is disposed at one side of the first housing so as to have the same center axis with the first housing, in which the other one of the plurality of the side gears which are engaged with the pinion gear is disposed, and which is provided with a portion of the flange portion to form the flange portion together with the portion of the flange portion of the first housing at an outer side thereof. The insertion portion may have the same length with the through hole which is formed in the portion of the flange portion of the first housing or may have the same length with the sum of lengths of the coupling hole formed in the portion of the flange portion of the first housing and the coupling hole formed in the portion of the flange portion of the second housing.

The coupling hole and the insertion portion may be respectively provided in a plural which are equidistantly disposed along a circumferential direction.

The bush may be formed of steel and the housing is formed of aluminum or magnesium.

Advantageous Effects

According to the present invention, since the coupling member is not directly coupled to the housing but is coupled to the bush which is connected to the housing, the direct contact friction between the housing and the coupling member which are made of different materials can be avoided and thus the damage of the coupling section can be prevented.

In addition, since the damage in the coupling section can be prevented due to the coupling between the bush and the coupling member, the coupling force between the coupling member and the bush can enhanced and thus the ring gear can be prevented from being separated from the housing.

DETAILED DESCRIPTION OF THE EMBODIMENTS

Embodiments of the present invention will be described in detail with reference to the accompanying drawings.

Figure 1:
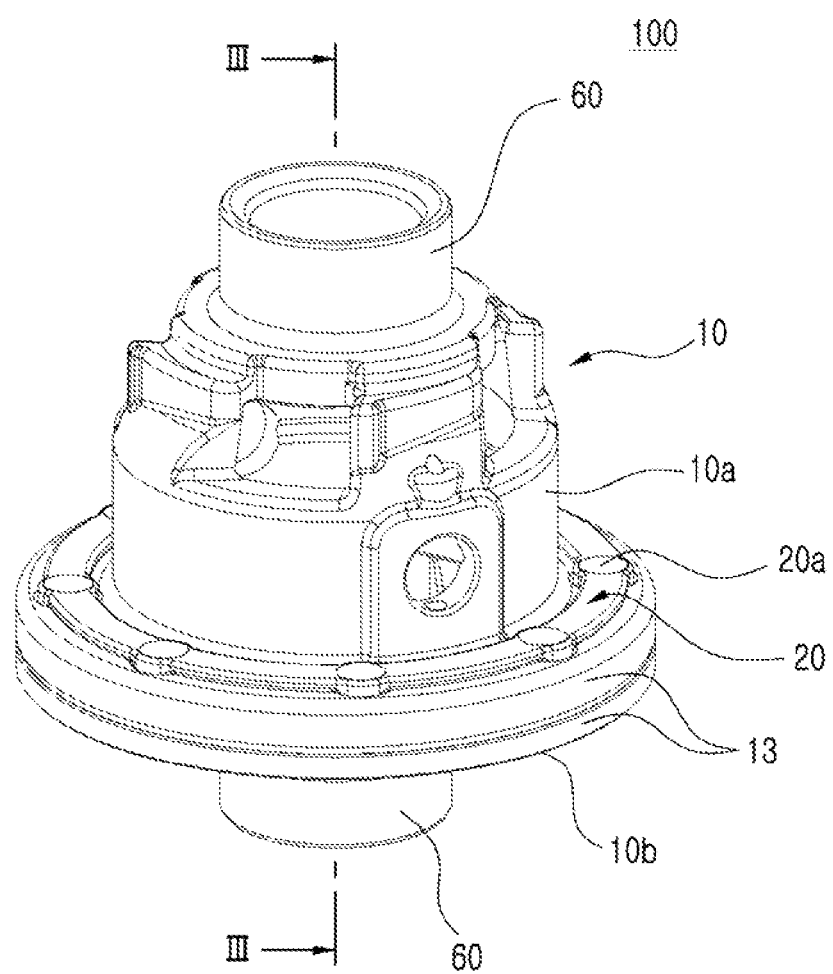
FIG. 1 is a perspective view of a differential for an automobile according to an embodiment of the present invention.
Figure 2:
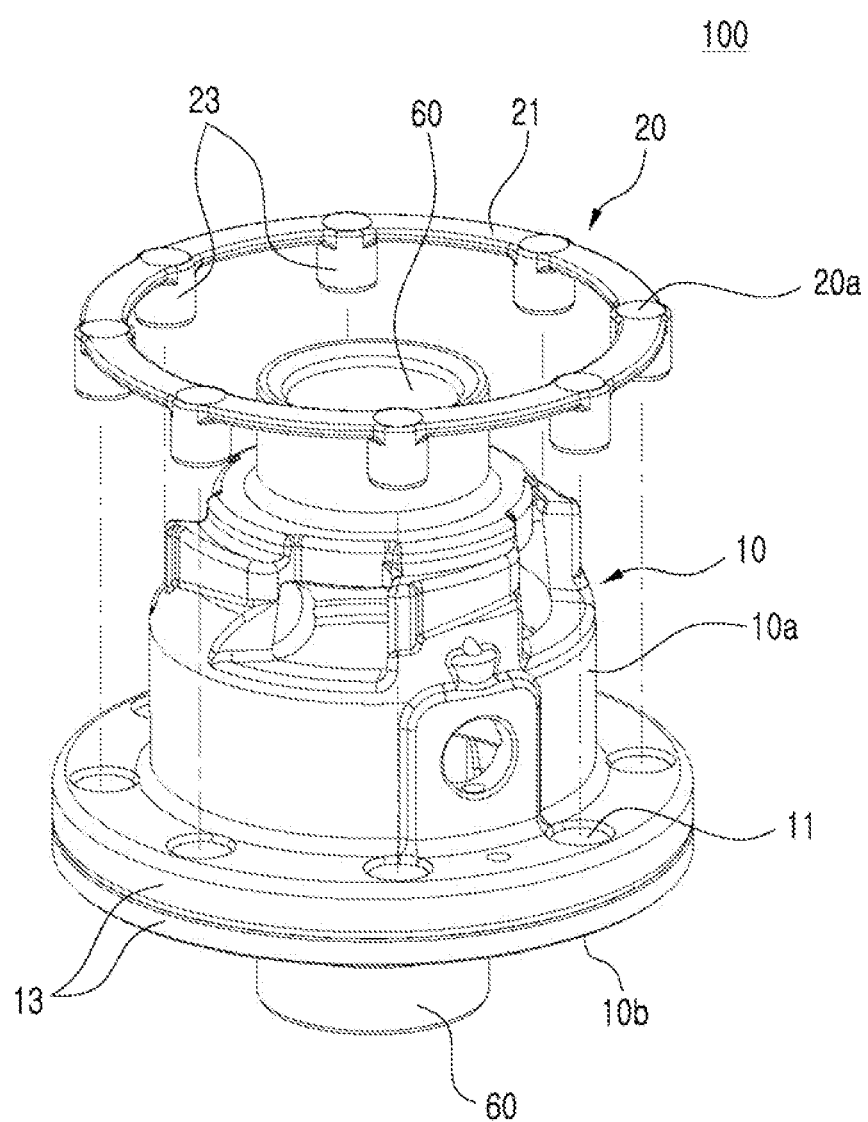
FIG. 2 is an exploded perspective view of a differential for an automobile according to an embodiment of the present invention.
Figure 3:
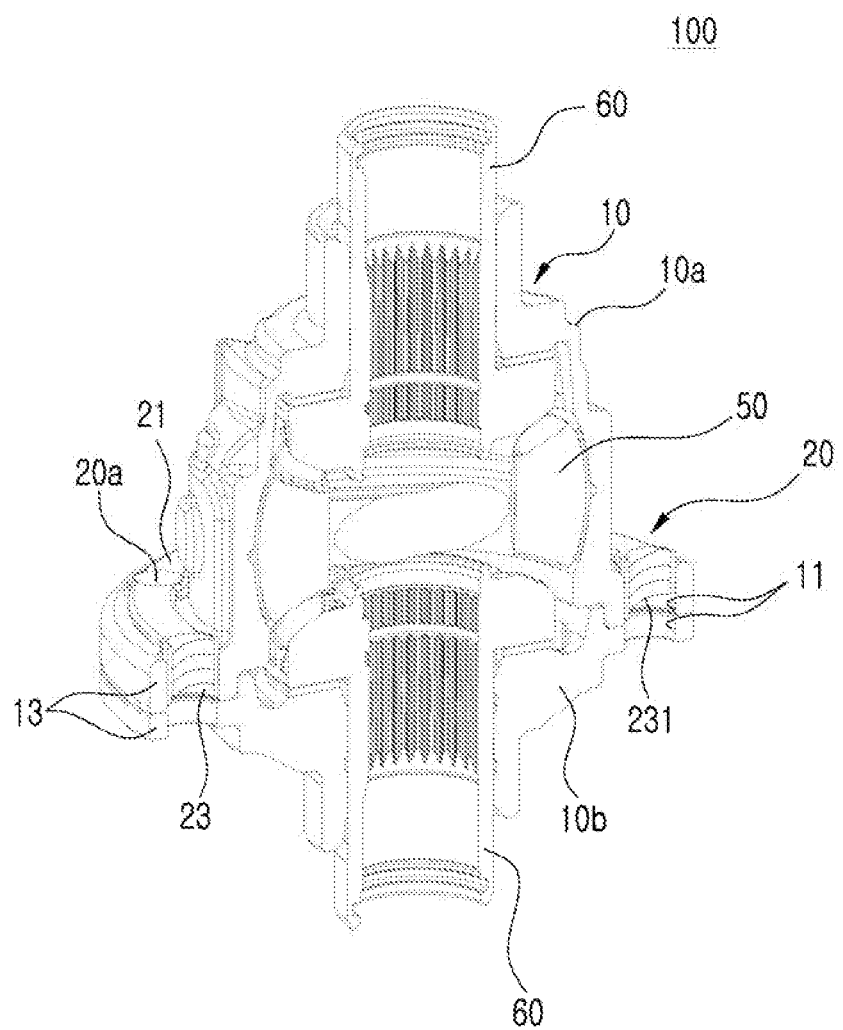
FIG. 3 is a sectional view taken along a line III-III in FIG. 1.
Figure 4:
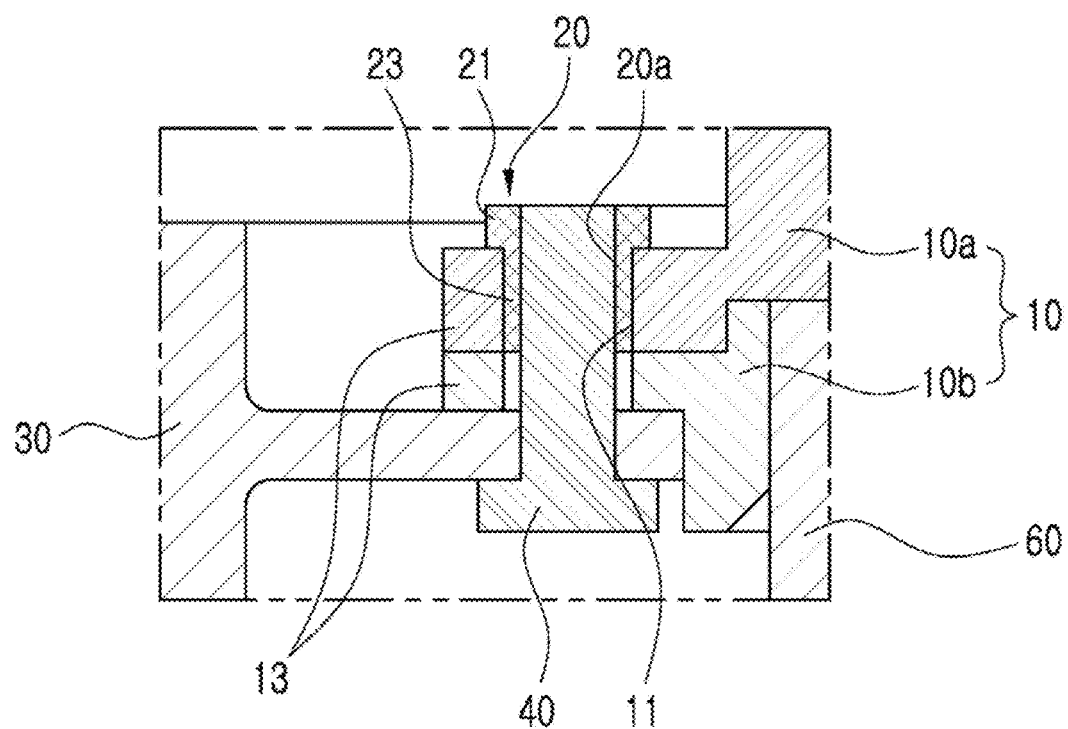
FIG. 4 schematically shows the state in which a ring gear is connected to a housing according to an embodiment of the present invention.
Figure 5:
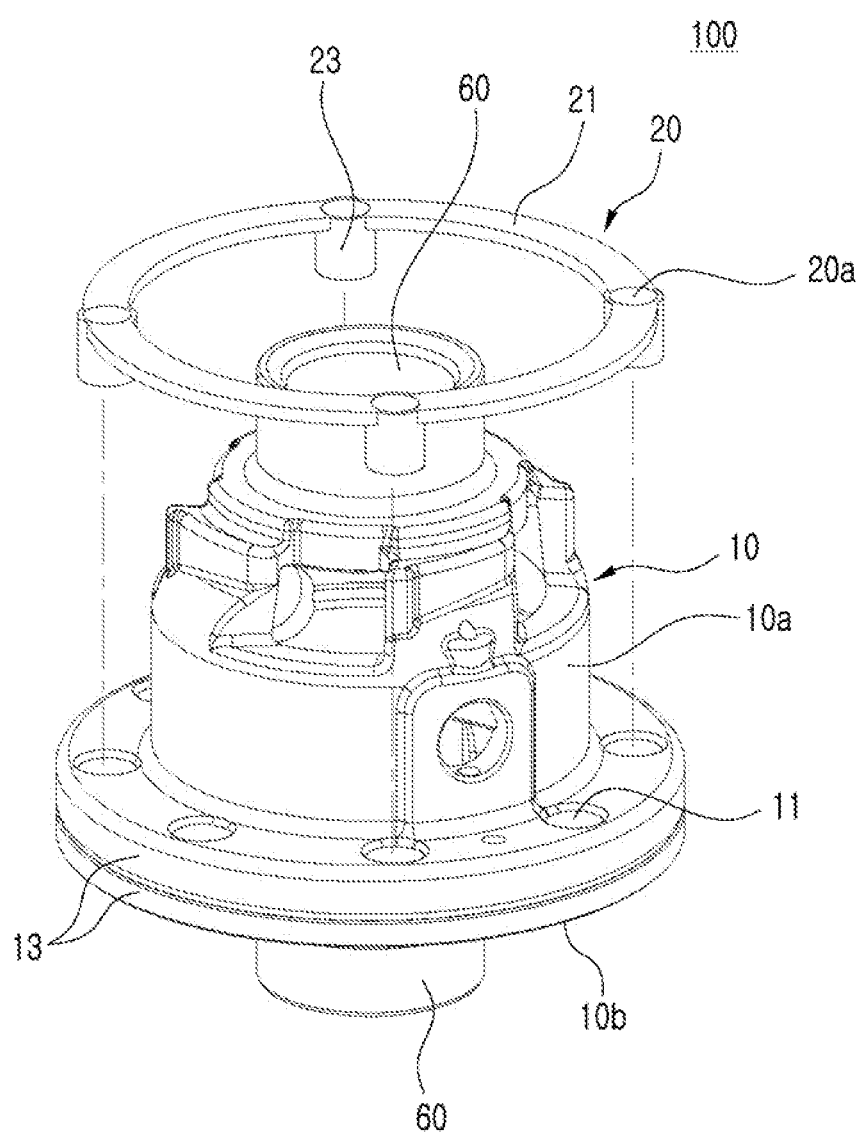
FIG. 5 is a perspective view of a bush of a differential for an automobile according to another embodiment of the present invention.

FIG. 1 is a perspective view of a differential for an automobile according to an embodiment of the present invention, FIG. 2 is an exploded perspective view of a differential for an automobile according to an embodiment of the present invention, FIG. 3 is a sectional view taken along a line III-III in FIG. 1, FIG. 4 schematically shows the state in which a ring gear is connected to a housing according to an embodiment of the present invention, and FIG. 5 is a perspective view of a bush of a differential for an automobile according to another embodiment of the present invention.

Referring to FIG. 1 and FIG. 2, a differential 100 for an automobile according to an embodiment of the present invention includes a housing 10.

A pinion gear 50 and a plurality of side gears 60 are disposed within the housing 10, and the housing 10 is provided with a flange portion 13 at an outer surface thereof in which a coupling hole 11 is formed along a circumferential direction.

In more detail, as shown in FIG. 3, the housing 10 may include a first housing 10a and a second housing 10b.

The first housing 10a may contain the pinion gear 50 and one of the side gears 60 which are engaged with the pinion gear 50 therein. A portion of the flange portion 13 which is elongated in a radial direction from the outer surface of the first housing 10a and in which a coupling hole 11 is formed may be provided at an outer side of the first housing 10a.

The second housing 10b is disposed at one side of the first housing to have the same center axis with the first housing 10a, and the other one of the plurality of the side gears 60 which are engaged with the pinion gear 50 is disposed at a center portion of the second housing 10b. Another portion of the flange portion 13 which is coupled with a portion of the flange portion 13 of the first housing 10a to form the flange portion 13 is elongated in a radial direction from the outer surface of the second housing 10b and in which a coupling hole 11 is formed is provided at an outer side of the second housing 10b.

In addition, the differential 100 includes a bush 20.

Referring to FIG. 3 and FIG. 4, the bush 20 is formed to be able to be coupled to the flange portion 13. In more detail, an insertion portion 23 which is inserted into the coupling hole 11 and is provided with a thread 231 on an inner circumferential surface thereof so as to be coupled with a coupling member 40 is formed at one side of the bush 20. Accordingly, the bush 20 is coupled to the flange portion 13 of the housing 10 via the insertion portion 23.

Hereinafter, the bush 20 will be described in more detail.

Referring again to FIG. 2, the bush 20 may include a seating portion 21 of a ring shape which is seated on one surface of the flange portion 13 of the first housing 10a, and the insertion portion 23 which is protruded by a predetermined length along the central axis from the seating portion 21 to be inserted into the coupling hole 11.

The insertion portion 23 may have a cylindrical shape and may be formed in a shape corresponding to the shape of the coupling hole 11. Accordingly, when the insertion portion 23 is coupled to the flange portion 13, the insertion portion 23 moves linearly along the center axis direction to be inserted into the coupling hole 11.

Also, the insertion portion 23 may be formed in a predetermined length.

In more detail, the insertion portion 23 may have the same length as the coupling hole 11 which is formed at a portion of the flange portion 13 of the first housing 10a as shown in FIG. 3, or may have the same length as the sum of lengths of the coupling hole 11 formed in the portion of the flange portion 13 of the first housing 10a and the coupling hole 11 formed in the portion of the flange portion 13 of the second housing 10b, not shown in the drawing. That is, the insertion portion 23 can be formed in various lengths so as to regulate the coupling force as required.

In addition, the insertion portion 23 may be formed in a predetermined outer diameter.

In more detail, the outer diameter of the insertion portion 23 may correspond to the diameter of the coupling hole 11 or may be greater than the diameter of the coupling hole of the flange portion 13. That is, the outer diameter of the insertion portion 23 may correspond to the diameter of the coupling hole 11 of the flange portion 13 so as to minimize the clearance between the insertion portion 23 and the flange portion 13. On the other hand, the outer diameter of the insertion portion 23 may be greater than the diameter of the coupling hole 11 of the flange portion 13 so that the insertion portion 23 can be pressed in the coupling hole 11.

Also, the bush 20 may be provided with a through hole 20a which penetrates the seating portion 21 and the insertion portion 23.

A thread 231 which can be engaged with the coupling member 40 may be formed on an inner surface of the bush 20 defining the through hole 20a.

The coupling hole 11 which is formed in the housing 10, the insertion portion 23 which is formed in the bush 20 and is inserted into the coupling hole 11 and the through hole 20a which is formed in the bush 20 may be respectively provided in a plural which are equidistantly disposed along a circumferential direction. Accordingly, when the bush 20 is coupled to the housing 10, the plurality of the insertion portions 23 are respectively inserted into the plurality of the coupling holes 11, so the bush 20 is prevented from rotating and can be stably fixed at a predetermined position. For example, the insertion portion 23 of the bush 20 may be provided in a plural, and the number of the insertion portions 23 may be the same with the number of the coupling holes 11 as shown in FIG. 2 or may be less than the number of the coupling holes 11.

Meanwhile, the bush 20 and the housing 10 may be formed in different series of materials.

In more detail, the bush 20 may be formed in steel alloy material, and the housing 10 may be formed in aluminum alloy material or magnesium alloy material.

The differential 100 includes the pinion gear 50 and the plurality of side gears 60 which are disposed within the housing 10.

The pinion gear 50 and the plurality of the side gears 60 are disposed in a state of being engaged with one another within the housing 10, and rotate in an engaged state in the event of speed difference between left and right wheels so as to transmit the driving force transmitted from the ring gear 30 to the drive shaft (not shown).

As such, according to the present invention, when the housing 10 and the coupling member 40 are coupled to one another, the coupling member 40 is coupled to the bush 20 which is connected to the housing 10 rather than being directly coupled to the housing 10, so the direct friction between the housing 10 and the coupling member 40 which are made of different series of material is avoided and thus the damage at the coupling section can be prevented.

Also, since the damage at the coupling section is prevented due to the coupling mechanism between the bush 20 and the coupling member 40, the coupling force between the coupling member 40 and the bush 20 can be enhanced and thus the ring gear 30 can be prevented from being separated from the housing 10.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A differential for an automobile comprising:
   a housing in which a pinion gear and a plurality of side gears are disposed and is provided with a flange portion in which a coupling hole is formed at an outer side thereof; and
   a bush which has an insertion portion which is inserted into the coupling hole and is provided with a thread at an inner surface thereof so as to be coupled with a coupling member.

2. The differential of claim 1, wherein the bush comprises:
   a seating portion in a ring shape which is seated on one surface of the flange portion; and
   the insertion portion which is protruded by a predetermined length along a center axis direction from the seating portion to be inserted into the coupling hole.

3. The differential of claim 2, wherein the insertion portion is formed in a cylindrical shape and is formed in a shape corresponding to the coupling hole to linearly move along a center axis direction of the housing to be inserted into the coupling hole while being coupled to the flange portion.

4. The differential of claim 2, wherein a through hole penetrating the seating portion and the insertion portion is formed in the bush, the thread is formed on an inner surface of the bush defining the through hole, and an outer diameter of the insertion portion corresponds to a diameter of the through hole of the flange portion or is greater than the diameter of the through hole of the flange portion.

5. The differential of claim 1, wherein the housing comprises:
   a first housing in which the pinion gear and one of the plurality of the side gears which are engaged with the pinion gear are disposed and which is provided with a portion of the flange portion at an outer side thereof; and
   a second housing which is disposed at one side of the first housing so as to have the same center axis with the first housing, in which the other one of the plurality of the side gears which are engaged with the pinion gear is disposed, and which is provided with a portion of the flange portion to form the flange portion together with the portion of the flange portion of the first housing at an outer side thereof,
   and wherein the insertion portion has the same length with the through hole which is formed in the portion of the flange portion of the first housing or has the same length with the sum of lengths of the coupling hole formed in the portion of the flange portion of the first housing and the coupling hole formed in the portion of the flange portion of the second housing.

6. The differential of claim 1, wherein the coupling hole and the insertion portion are respectively provided in a plural which are equidistantly disposed along a circumferential direction.

7. The differential of claim 1, wherein the bush is formed of steel and the housing is formed of aluminum or magnesium.

* * * * *